United States Patent
Hane et al.

(10) Patent No.: US 7,638,994 B2
(45) Date of Patent: Dec. 29, 2009

(54) SWITCHING POWER SUPPLY CIRCUIT

(75) Inventors: Norimasa Hane, Tokyo (JP); Takeshi Naka, Tokyo (JP)

(73) Assignees: Torex Semiconductor Ltd., Tokyo (JP); Device Engineering Co. Ltd., Tokyo (JP)

( * ) Notice: Subject to any disclaimer, the term of this patent is extended or adjusted under 35 U.S.C. 154(b) by 365 days.

(21) Appl. No.: 11/810,348

(22) Filed: Jun. 5, 2007

(65) Prior Publication Data

US 2008/0007233 A1 Jan. 10, 2008

(30) Foreign Application Priority Data

Jun. 5, 2006 (JP) ............................. 2006-156667

(51) Int. Cl.
*G05F 1/56* (2006.01)

(52) U.S. Cl. .................... 323/285; 323/222; 323/271

(58) Field of Classification Search ................ 323/222, 323/271, 282, 285
See application file for complete search history.

(56) References Cited

U.S. PATENT DOCUMENTS

| 5,912,552 | A | 6/1999 | Tateishi |
| 6,815,939 | B2 | 11/2004 | Umemoto et al. |
| 7,239,119 | B2* | 7/2007 | Baurle et al. ................. 323/284 |
| 7,245,113 | B2* | 7/2007 | Chen et al. ................... 323/271 |
| 7,498,793 | B2* | 3/2009 | Xu ............................... 323/288 |
| 7,541,795 | B1* | 6/2009 | Smith et al. .................. 323/285 |
| 7,545,129 | B2* | 6/2009 | Hane et al. ................... 323/282 |
| 2003/0231012 | A1* | 12/2003 | Corva et al. ................. 323/285 |
| 2005/0258814 | A1* | 11/2005 | Chen et al. ................... 323/285 |
| 2009/0108824 | A1* | 4/2009 | Chen ........................... 323/285 |

FOREIGN PATENT DOCUMENTS

| JP | 10-225105 A | 8/1998 |
| JP | 2003-319643 | 11/2003 |

* cited by examiner

*Primary Examiner*—Jeffrey L Sterrett
(74) *Attorney, Agent, or Firm*—The Webb Law Firm

(57) ABSTRACT

A switching power supply circuit has a current mode control circuit including current detection means, and current mode signal generation means for generating a current mode signal being a drain current of a first MOS transistor obtained by supplying a first current information signal, which is an output signal of the current detection means, to the gate of the first MOS transistor, and by connecting a first resistance to the source of the first MOS transistor, and supplies the current mode signal to a feedback control system of the switching power supply circuit.

19 Claims, 17 Drawing Sheets

SWITCHING POWER SUPPLY CIRCUIT

The entire disclosure of Japanese Patent Application No. 2006-156667 filed Jun. 5, 2006 is expressly incorporated by reference herein.

BACKGROUND OF THE INVENTION

1. Field of the Invention

This invention relates to a switching power supply circuit and, more specifically, to a switching power supply circuit useful when detecting a current flowing in the circuit, and providing feedback on current information to obtain a predetermined output voltage.

2. Description of the Related Art

In a switching power supply circuit, a current feedback mode is in wide use for maintaining the stability of the switching power supply circuit.

This type of switching power supply circuit concerned with an earlier technology is shown in FIG. 17. As shown in this drawing, the illustrated switching power supply circuit is a step-up switching power supply circuit, which comprises a switching means SW1 formed from an N-channel MOS transistor, a switching means SW2 formed from a P-channel MOS transistor, and an inductor L, for converting a direct current input voltage VIN into a predetermined direct current output voltage VOUT.

An error amplifier 1 constituting a feedback control system outputs an error signal $V_{err}$, which represents a differential voltage between a preset reference voltage VREF and a voltage obtained by dividing the direct current output voltage VOUT by resistances R01 and R02. A PWM comparator 2 constituting the feedback control system compares the error signal $V_{err}$ with an oscillation signal RAMP outputted by an oscillation circuit 3, and exercises on/off control of the switching means SW1 to SW2 by a switching signal SWS of a predetermined duty determined based on the comparison. More concretely, a buffer circuit 4 constituting the feedback control system forms switching signals SWS1 and SWS2, based on the switching signal SWS, such that the switching means SW2 is OFF during the ON-period of the switching means SW1, thereby turning the switching means SW1 and the switching means SW2 on and off alternately. In the drawing, C01 signifies an output capacitor, and C02 signifies a speed-up capacitor.

Such a switching power supply circuit further provides the feedback control system with a current feedback system for providing feedback on current information in order to stabilize control. That is, based on a current ISW flowing to the switching means SW1, a current information signal S11 is formed by utilization of a voltage at the point of connection between the switching means SW1 and a current detection resistance $R_{sen}$. The current information signal S11 is supplied to a differential amplifier 6 to obtain a current superposed signal S12, which is added to the aforementioned error signal $V_{err}$ (substantially, subtracted from the error signal $V_{err}$, because the sign of the current superposed signal S12 is minus) at an adder 5, whereby a new error signal $V_{err-r}$ is obtained. This error signal $V_{err-r}$ is compared with the oscillation signal RAMP by the PWM comparator 2.

The current information signal S11 is supplied to an inverting input terminal of the differential amplifier 6 having a non-inverting input terminal grounded.

With the above-mentioned earlier technology, the current ISW flowing into the switching means SW1 is formed into the current information signal S11 by utilization of the voltage at the point of connection between the switching means SW1 and the current detection resistance $R_{sen}$, and the current information signal S11 is supplied to the differential amplifier 6, and further supplied to the adder 5 of the feedback control system. That is, the current ISW of the switching signal SWS1 is amplified by the differential amplifier 6, which is also an amplifier. This poses the problem that a processing speed is low and a response is poor. As a result, this earlier technology has been difficult to apply to a high frequency switching power supply circuit, in particular.

To improve the conversion efficiency of this type of switching power supply circuit, it is necessary to lower the resistance values of the switching means SW1 and the current detection resistance $R_{sen}$ connected to the switching means SW1. If the resistance values become low, however, a voltage drop caused at the current detection resistance $R_{sen}$ by the current ISW is decreased. As a result, the influence of the offset voltage of the differential amplifier 6 increases, presenting the problem of rendering the action of the switching power supply circuit unstable.

Like the earlier technology shown in FIG. 17, known patent documents, namely, Japanese Patent No. 3636321 (patent document 1) and Japanese Unexamined Patent Publication No. 1998-225105 (patent document 2), can be named as disclosing switching power supply circuits having current feedback systems. However, these technologies pose problems similar to those of the earlier technology shown in FIG. 17 that has been described above. That is, they have the problem of a low processing speed and a poor response. They encounter the problem, in particular, that their application to a high frequency switching power supply circuit is difficult, and they essentially render the action of the switching power supply circuit unstable.

SUMMARY OF THE INVENTION

The present invention has been accomplished in the light of the above-mentioned earlier technologies. It is an object of the present invention to provide a switching power supply circuit capable of ensuring a prompt response to a circuit current, and also ensuring the stability of an action.

A first aspect of the present invention, for attaining the above object, is a switching power supply circuit having a feedback control system for detecting a direct current output voltage and a current flowing through switching means or an inductor, and exercising on-off control of the switching means, comprising:

a current mode control circuit including current detection means for detecting the current, and current mode signal generation means for generating a current mode signal being a drain current or a source current of a first MOS transistor obtained by supplying a first current information signal, which is an output signal of the current detection means, to a gate of the first MOS transistor, and connecting a first resistance to a source or a drain of the first MOS transistor, and adapted to supply the current mode signal to the feedback control system.

A second aspect of the present invention is the switching power supply circuit according to the first aspect, characterized in that the current mode signal generation means adds the current mode signal to an output of, or an interior of, an error amplifier of the feedback control system, which outputs an error signal representing a differential voltage between a preset reference voltage and a voltage based on the direct current output voltage, such that a duty ratio of the output of the error amplifier is decreased.

A third aspect of the present invention is the switching power supply circuit according to the first or second aspect, characterized in that the current mode control circuit further includes current correction signal generation means for generating a current correction signal for correcting the current mode signal with a drain current or a source current of a second MOS transistor which is obtained by supplying a second current information signal for the first current information signal to a gate of the second MOS transistor, and by connecting a second resistance to a source or a drain of the second MOS transistor.

A fourth aspect of the present invention is the switching power supply circuit according to the third aspect, characterized in that the second current information signal is a voltage, at which the current shows zero or nearly zero, or is a voltage conformed to the current.

A fifth aspect of the present invention is the switching power supply circuit according to the third aspect, characterized in that the current correction signal generation means has a third resistance and a first capacitor connected in series, delays the first current information signal, which has been detected by the current detection means, based on a time constant, and outputs the delayed first current information signal as the second current information signal via a point of connection between the third resistance and the first capacitor.

A sixth aspect of the present invention is the switching power supply circuit according to any one of the third to fifth aspects, which exercises control, based on the current mode signal, such that an ON-period of a switching signal for on-off control of the switching means is shortened, and also exercises control, based on the current correction signal, such that the ON-period of the switching signal is lengthened.

A seventh aspect of the present invention is the switching power supply circuit according to any one of the third to sixth aspects, characterized in that a signal based on the current mode signal and the current correction signal is outputted to a PWM comparator of the feedback control system, the PWM comparator receiving the output of the error amplifier as one of inputs and receiving the signal as the other input.

An eighth aspect of the present invention is the switching power supply circuit according to the seventh aspect, characterized in that the signal based on the current mode signal and the current correction signal is superposed on a RAMP wave to be supplied to the PWM comparator, and the superposed signal is supplied to the PWM comparator as the other input.

A ninth aspect of the present invention is the switching power supply circuit according to the seventh or eighth aspect, characterized in that an output signal of the PWM comparator becomes a control signal for on-off control of the switching means via a flip-flop circuit.

A tenth aspect of the present invention, for attaining the aforementioned object, is a switching power supply circuit having a feedback control system for detecting a direct current output voltage and a current flowing through switching means or an inductor, and exercising on-off control of the switching means, comprising:
  a current limiting circuit including
  current detection means for detecting the current,
  current mode signal generation means for generating a current mode signal being a drain current or a source current of a first MOS transistor obtained by supplying a first current information signal, which is an output signal of the current detection means, to a gate of the first MOS transistor, and connecting a first resistance to a source or a drain of the first MOS transistor, and current correction signal generation means for generating a current correction signal for correcting the current mode signal with a drain current or a source current of a second MOS transistor which is obtained by supplying a second current information signal for the first current information signal to a gate of the second MOS transistor, and by connecting a second resistance to a source or a drain of the second MOS transistor, and adapted to exercise control via the feedback control system such that the switching means becomes OFF, if a value of the current exceeds a limiting current value.

An eleventh aspect of the present invention is the switching power supply circuit according to the tenth aspect, characterized in that a signal based on the current mode signal and the current correction signal is outputted to an input stage of current limiting comparison means for comparing the signal with the limiting current value.

A twelfth aspect of the present invention is the switching power supply circuit according to the tenth or eleventh aspect, characterized in that the second current information signal is taken as the limiting current value.

A thirteenth aspect of the present invention is the switching power supply circuit according to any one of the third to twelfth aspects, characterized in that the current mode signal generation means and the current correction signal generation means constitute current superposition means being a current mirror circuit.

A fourteenth aspect of the present invention is the switching power supply circuit according to the thirteenth aspect, characterized in that influence on the current mode signal based on the first current information signal is greater than influence on the current correction signal based on the second current information signal.

A fifteenth aspect of the present invention is the switching power supply circuit according to the thirteenth or fourteenth aspect, characterized in that the current superposition means has the current correction signal supplied to a gate and a drain of a fourth MOS transistor and a gate of a third MOS transistor, and has the current mode signal supplied to a drain of the third MOS transistor, constituting an output stage.

A sixteenth aspect of the present invention is the switching power supply circuit according to the thirteenth or fourteenth aspect, characterized in that the current superposition means has the current mode signal supplied to a gate and a drain of a fourth MOS transistor and a gate of a third MOS transistor, and has the current correction signal supplied to a drain of the third MOS transistor, constituting an output stage.

A seventeenth aspect of the present invention is the switching power supply circuit according to the thirteenth or fourteenth aspect, characterized in that the current superposition means has the current correction signal supplied to a gate and a drain of a fourth MOS transistor and a gate of a fifth MOS transistor, and has the current mode signal supplied to a gate and a drain of a third MOS transistor, a drain of the fifth MOS transistor and a gate of a sixth MOS transistor, and further has a drain of the sixth MOS transistor constituting an output stage.

An eighteenth aspect of the present invention is the switching power supply circuit according to any one of the fifteenth to seventeenth aspects, characterized in that a fourth resistance or a second capacitor is connected to the output stage, and a level of an output signal of the current superposition means can be adjusted by a ratio between the first resistance and the fourth resistance, or a ratio between the first resistance and the second capacitor.

A nineteenth aspect of the present invention is the switching power supply circuit according to any one of the first to eighteenth aspects, characterized in that the first MOS transistor is of a depletion type, or the first MOS transistor and the second MOS transistor are each of a depletion type.

A twentieth aspect of the present invention is the switching power supply circuit according to any one of the first to nineteenth aspects, characterized in that the current detection means obtains the first current information signal from a point of connection between the switching means and a fifth resistance connected in series with the switching means.

A twenty-first aspect of the present invention is the switching power supply circuit according to any one of the first to nineteenth aspects, characterized in that the current detection means obtains the first current information signal from a point of connection between a current detection switching means, which is connected to the switching means via an ON-resistance of the switching means, and a third capacitor connected in series with the current detection switching means.

A twenty-second aspect of the present invention is the switching power supply circuit according to any one of the first to nineteenth aspects, characterized in that the current detection means obtains the first current information signal from a point of connection between the inductor and a sixth resistance connected in series with the inductor.

According to the present invention having the above-described features, the current feedback system is constructed by supplying the first current information signal, which is the output signal of the current detection means, to the gate of the first MOS transistor, and utilizing the current mode signal formed by the drain current of the first MOS transistor. That is, the desired current mode signal is formed by the single MOS transistor. Thus, a very quick response can be achieved.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

Figure 17:
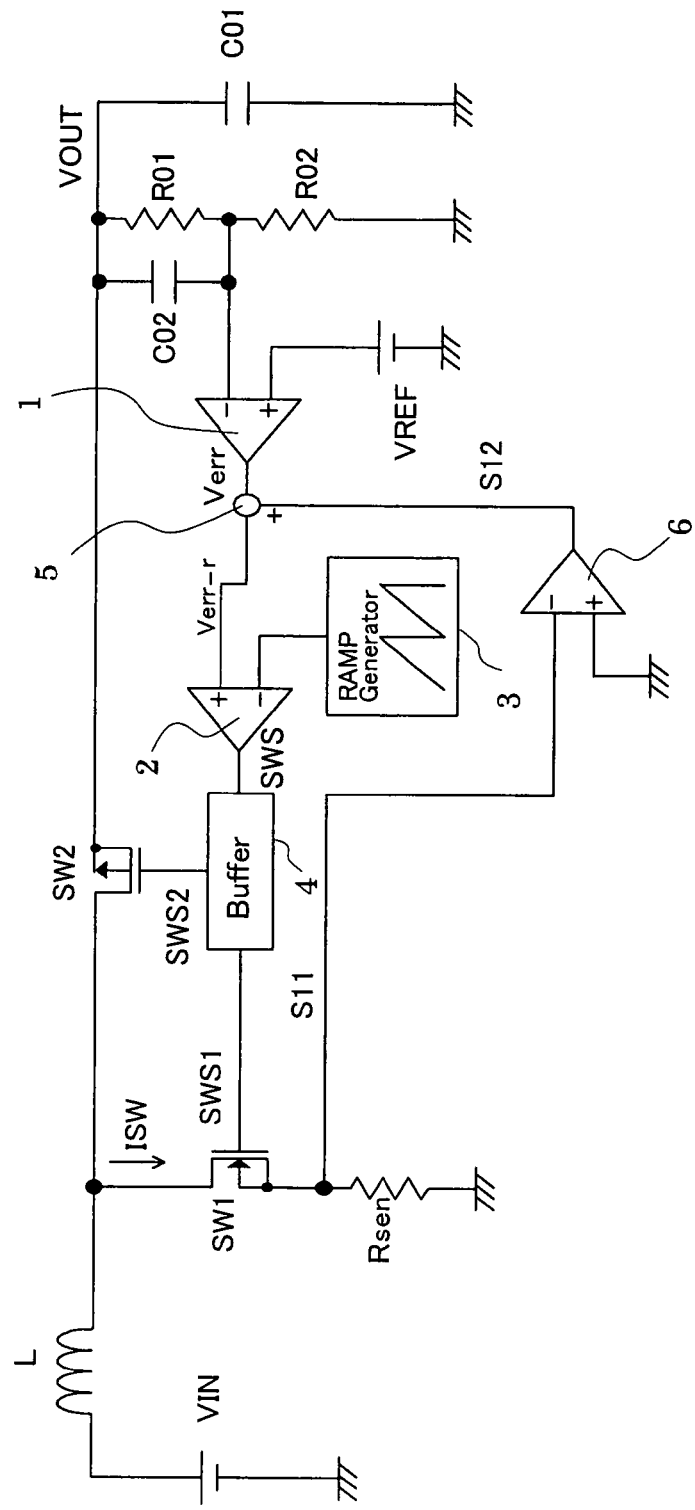
FIG. 17 is a circuit diagram showing the switching power supply circuit according to the earlier technology.

The embodiments of the present invention will now be described in detail with reference to the accompanying drawings. The basic configuration of a switching power supply circuit in each embodiment is the same as that of the switching power supply circuit shown in FIG. 17. Thus, the same portions as those in FIG. 17 are assigned the same numerals and symbols, and duplicate explanations are omitted.

First Embodiment

Figure 1:
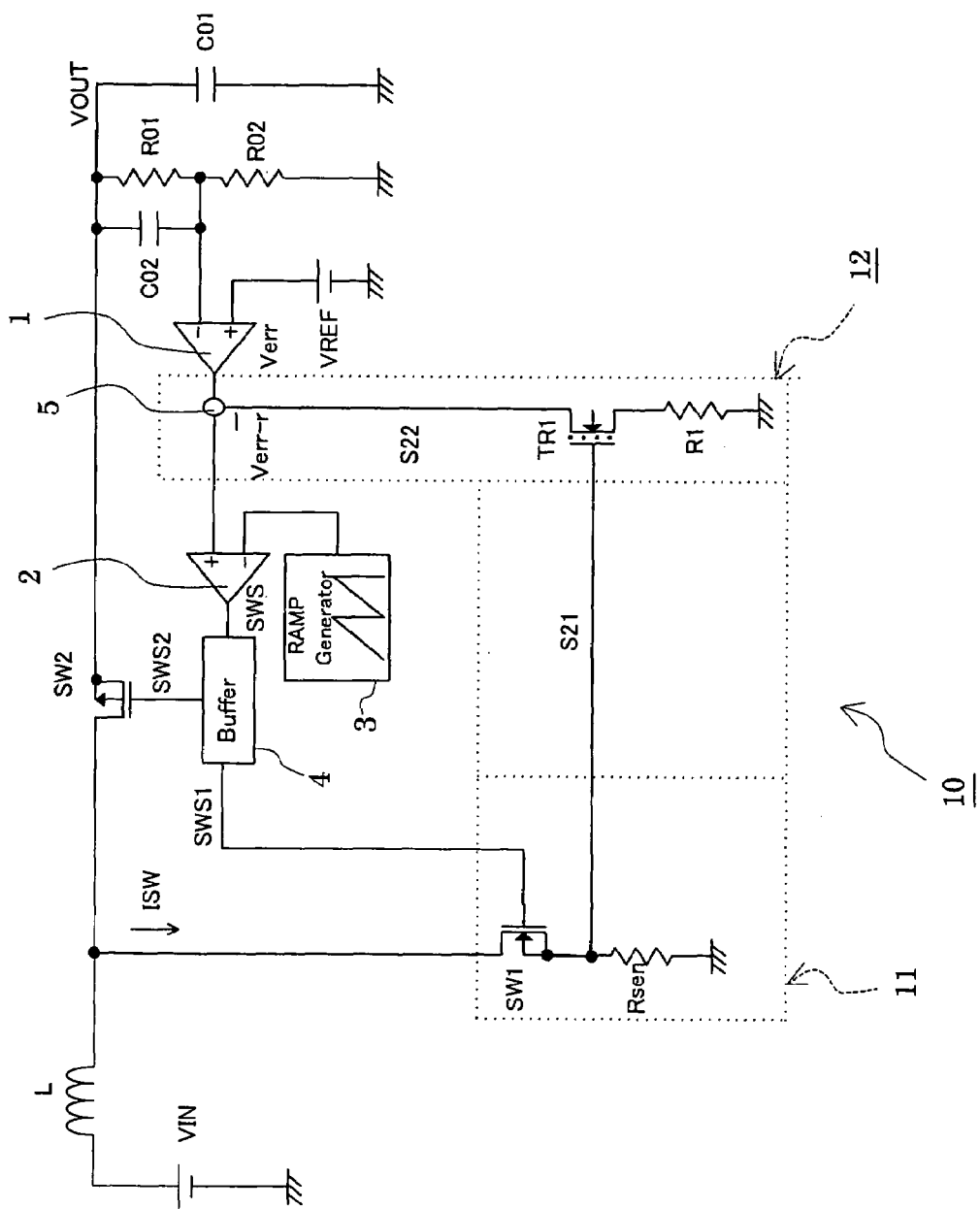
FIG. 1 is a circuit diagram showing a switching power supply circuit according to a first embodiment of the present invention.

FIG. 1 is a circuit diagram showing a switching power supply circuit according to a first embodiment of the present invention. As shown in this drawing, the switching power supply circuit according to the present embodiment has a current mode control circuit 10 comprising a current detection means 11 and a current mode signal generation means 12, and the current mode control circuit 10 constitutes a current feedback system.

In further detail, the current detection means 11 comprises a switching means SW1 and a current detection resistance $R_{sen}$ connected in series with the switching means SW1, and obtains a first current information signal S21 from the point of connection between the switching means SW1 and the current detection resistance $R_{sen}$.

The current mode signal generation means 12 generates a current mode signal S22 which is the drain current of a first MOS transistor TR1 obtained by supplying the first current information signal S21, as the output signal of the current detection means 11, to the gate of the first MOS transistor TR1 formed of a depletion type, and connecting a first resistance R1 to the source of the first MOS transistor TR1. The drain side of the first MOS transistor TR1 is connected to an adder 5 of a feedback control system. The current mode signal S22 is added to the output side of an error amplifier 1 via the adder 5 such that the duty ratio of the output signal of the error amplifier 1 is decreased. In this manner, current feedback control is exercised over the feedback control system for on-off control of the switching means SW1 and SW2 in the switching power supply circuit.

In the present embodiment described above, the desired current feedback control is effected by utilizing the current mode signal S22 which is obtained by supplying the first current information signal S21, the output signal of the current detection means 11, to the gate of the first MOS transistor TR1. That is, the above control is performed by the current mode signal S22 which is formed by the single MOS transistor TR1. Thus, a very swift response can be ensured for the control.

Second Embodiment

Figure 2:
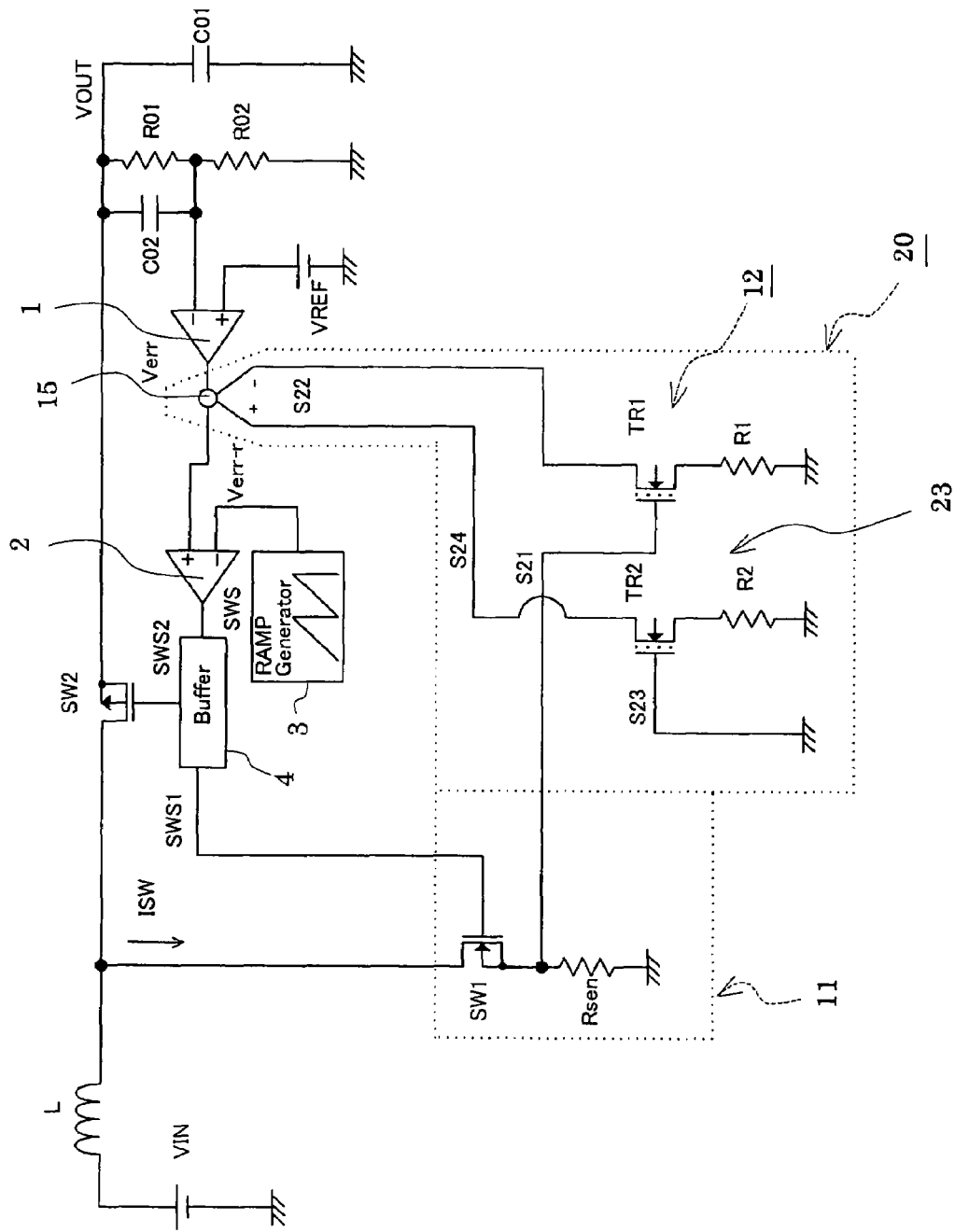
FIG. 2 is a circuit diagram showing a switching power supply circuit according to a second embodiment of the present invention.

FIG. 2 is a circuit diagram showing a switching power supply circuit according to a second embodiment of the present invention. As shown in this drawing, the present embodiment is a variation of the configuration of the current mode control circuit 10 according to the first embodiment. The other features in the present embodiment are exactly the same as those in the first embodiment. Thus, the same portions as those in FIG. 1 are assigned the same numerals and symbols, and duplicate explanations are omitted.

A current mode control circuit 20 according to the present embodiment has a current correction signal generation means 23 as well as a current mode signal generation means 12. The current correction signal generation means 23 generates a current correction signal S24 for correcting a current mode signal S22 with the drain current of a second MOS transistor TR2 which is obtained by supplying a second current correction signal S23 for a first current information signal S21 to the gate of the second MOS transistor TR2 formed of a depletion type, and connecting a second resistance R2 to the source or drain of the second MOS transistor TR2.

The second current correction signal S23 in the present embodiment is obtained as a gate voltage, with the gate of the second MOS transistor TR2 being grounded. That is, a signal obtained from the other end of a current detection resistance $R_{sen}$ is taken as the second current correction signal S23. In this case, the second current correction signal S23 is a voltage, at which a current ISW shows zero or a value in the vicinity of zero, or is a voltage conformed to the above current.

In the present embodiment, the current mode signal S22 and the current correction signal S24 are supplied to an adder-subtracter 15 such that the current mode signal S22 is subtracted there, while the current correction signal S24 is added there. Thus, a switching signal SWS, which is the output signal of a PWM comparator 2, is controlled based on the first current information signal S21 such that its ON-period is shortened, and is also controlled based on the second current correction signal S23 such that its ON-period is lengthened.

In the present embodiment described above, not only the actions and effects of the first embodiment, but also the following actions and effects are obtained: The error signal $V_{err}$, which is the output signal of the error amplifier 1 of the feedback control system, is controlled promptly and appropriately in response to a load change or the like of the switching power supply circuit, whereby it becomes possible to contribute to stable control of the switching power supply circuit by the feedback control system.

The second current correction signal S23 is not limited to the above signal, but on the assumption that an arbitrary direct current amount is present, a signal representing this direct current amount can be used arbitrarily. Thus, any signal, which can be supplied as the gate voltage of the second MOS transistor TR2, is usable without limitation.

Figure 3:
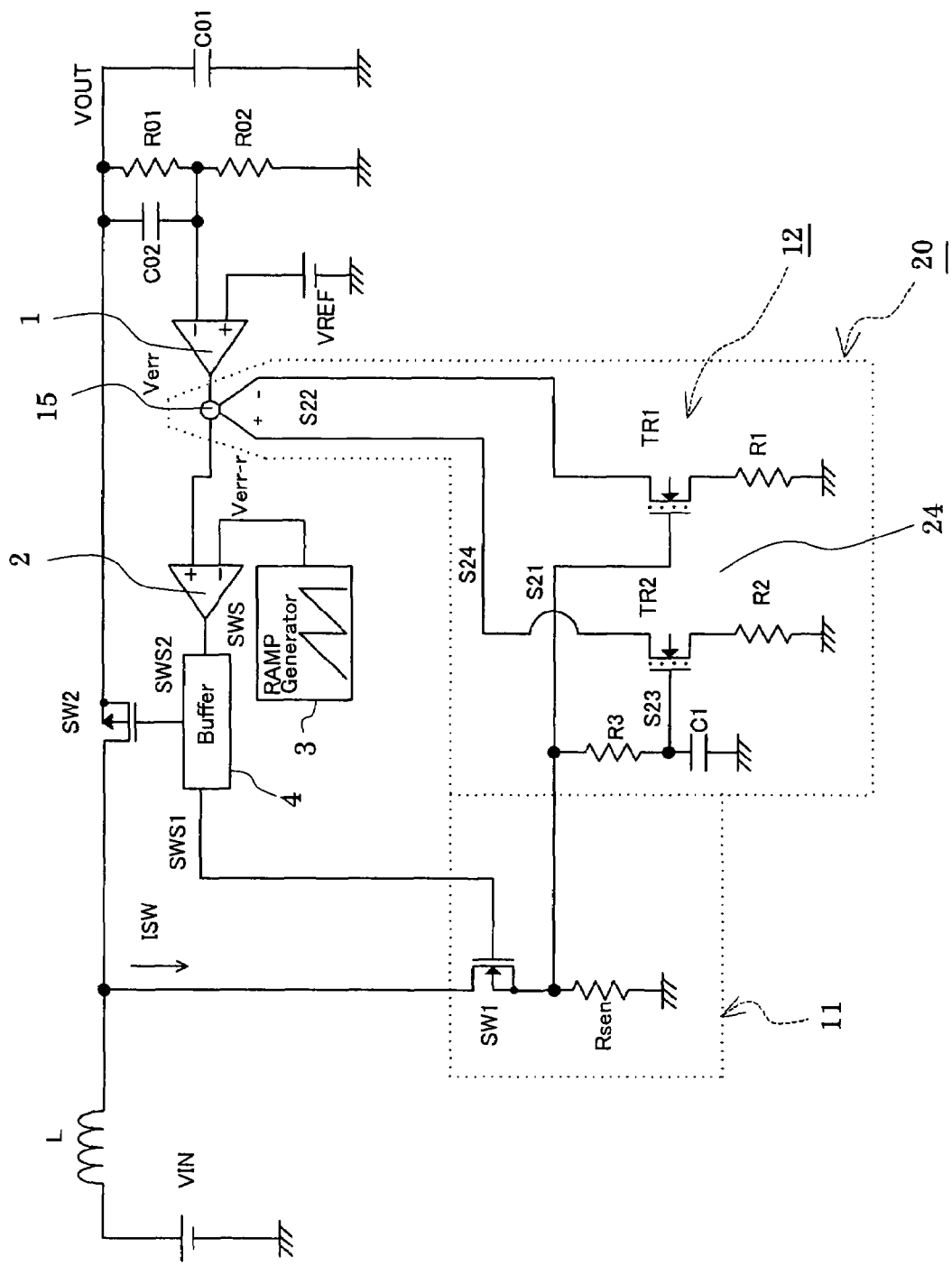
FIG. 3 is a circuit diagram showing a switching power supply circuit according to a modification of the second embodiment.

For example, a switching power supply circuit having a current correction signal generation means 24 shown in FIG. 3 can be named as a preferred modification. The current correction signal generation means 24 shown in the drawing is a partial variation of the configuration of the current correction signal generation means 23 shown in FIG. 2.

As shown in FIG. 3, the current correction signal generation means 24 in the present embodiment has a third resistance R3 and a first capacitor C1 connected in series, and delays the first current information signal S21, which has been detected by the current detection means 11, based on a time constant. Also, the current correction signal generation means 24 forms a second current correction signal S23 via the point of connection between the third resistance R3 and the first capacitor C1, and supplies this second current correction signal S23 to the gate of the second MOS transistor TR2.

According to the present embodiment described above, if a load change occurs in the switching power supply circuit to cause a change to the current ISW flowing into the switching means SW1, a great difference occurs between the first current information signal S21 and the second current correction signal S23 to suppress a change in the error signal $V_{err}$ which is the output signal of the error amplifier 1.

In this manner, the stabilization of the switching power supply circuit can be achieved. If a steady state is attained thereafter, the difference between the first current information signal S21 and the second current correction signal S23 can be diminished. Thus, the error signal $V_{err}$ becomes equal to the same state as that before a transient response, thereby making it possible to decrease the operating range of the error amplifier 1.

Third Embodiment

Figure 4:
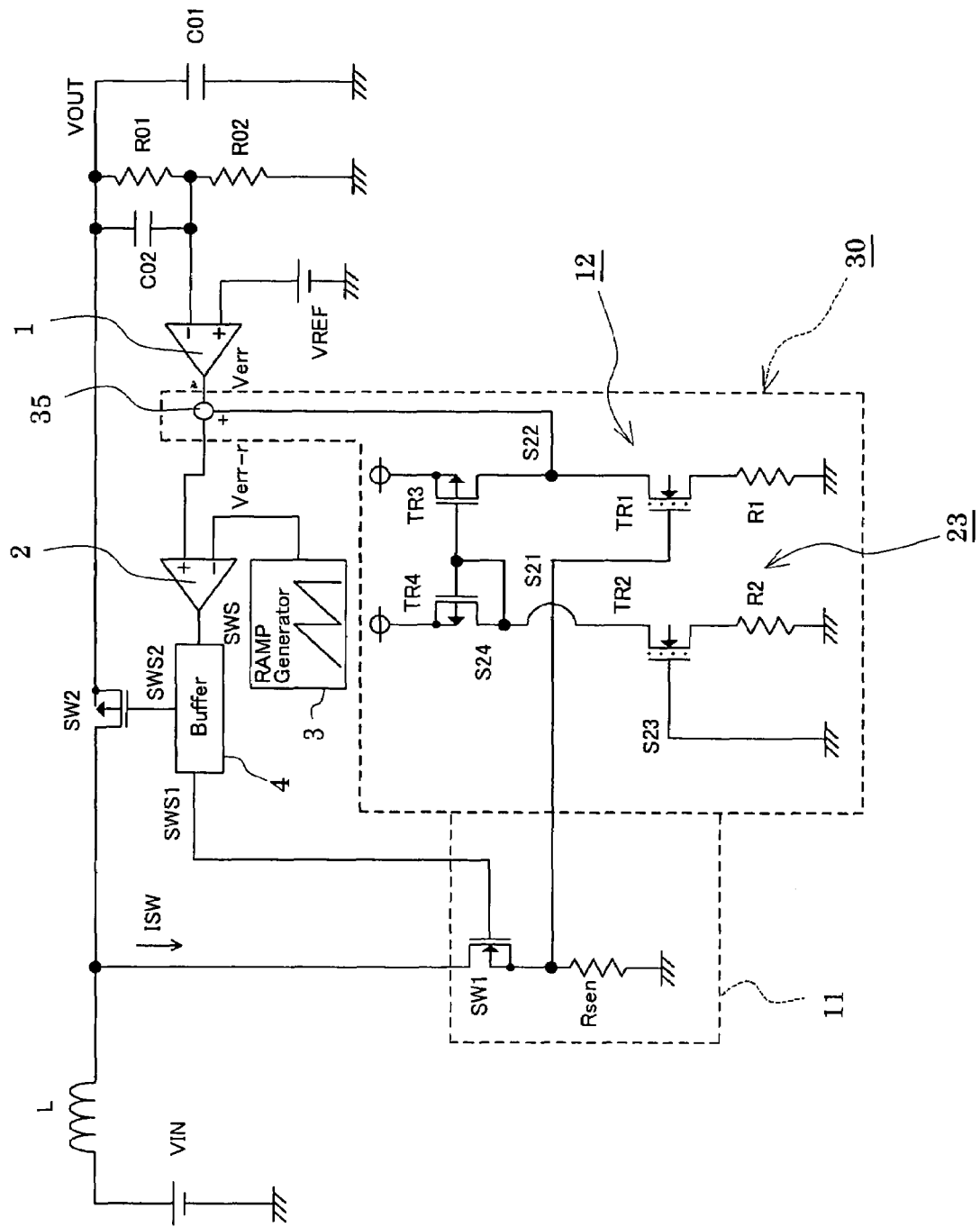
FIG. 4 is a circuit diagram showing a switching power supply circuit according to a third embodiment of the present invention.

FIG. 4 is a circuit diagram showing a switching power supply circuit according to a third embodiment of the present invention. As shown in this drawing, the present embodiment is a variation of the configuration of the current mode control circuit 20 according to the second embodiment. The other features in the present embodiment are exactly the same as those in the second embodiment. Thus, the same portions as those in FIG. 2 are assigned the same numerals and symbols, and duplicate explanations are omitted.

A current mode control circuit 30 according to the present embodiment comprises a current mode signal generation means 12 and a current correction signal generation means 23 constituting a current mirror circuit which serves as a current superposition means. That is, the current superposition means is constructed such that a current correction signal S24 is supplied to the gate and drain of a fourth MOS transistor TR4 and the gate of a third MOS transistor TR3, and a current mode signal S22 is supplied to the drain of the third MOS transistor TR3, constituting an output stage. This output stage of the current superposition means is connected to an adder 35. The resulting superposed signal is added at the adder 35 to the error signal $V_{err}$, which is the output signal of the error amplifier 1 of the feedback control system, to produce a new error signal $V_{err-r}$, which is supplied to the non-inverting input terminal of the PWM comparator 2.

Here, the current mode control circuit 30 may be constituted such that the influence on the current mode signal S22 based on the current information signal S21 is greater than the influence on the current correction signal S24 based on the second current correction signal S23. This can be easily realized by selecting, as appropriate, the specifications for the circuit elements of the current mirror circuit, for example, providing an offset between the resistance values of a first resistance R1 and a second resistance R2.

The present embodiment described above is not only able to obtain the same actions and effects as those in the second embodiment, but is also capable of easily superposing the current mode signal S22 and the current correction signal S24 by the current mirror circuit, thus adjusting the influence of the current correction signal S24 on the current mode signal S22 easily and appropriately.

Figure 5:
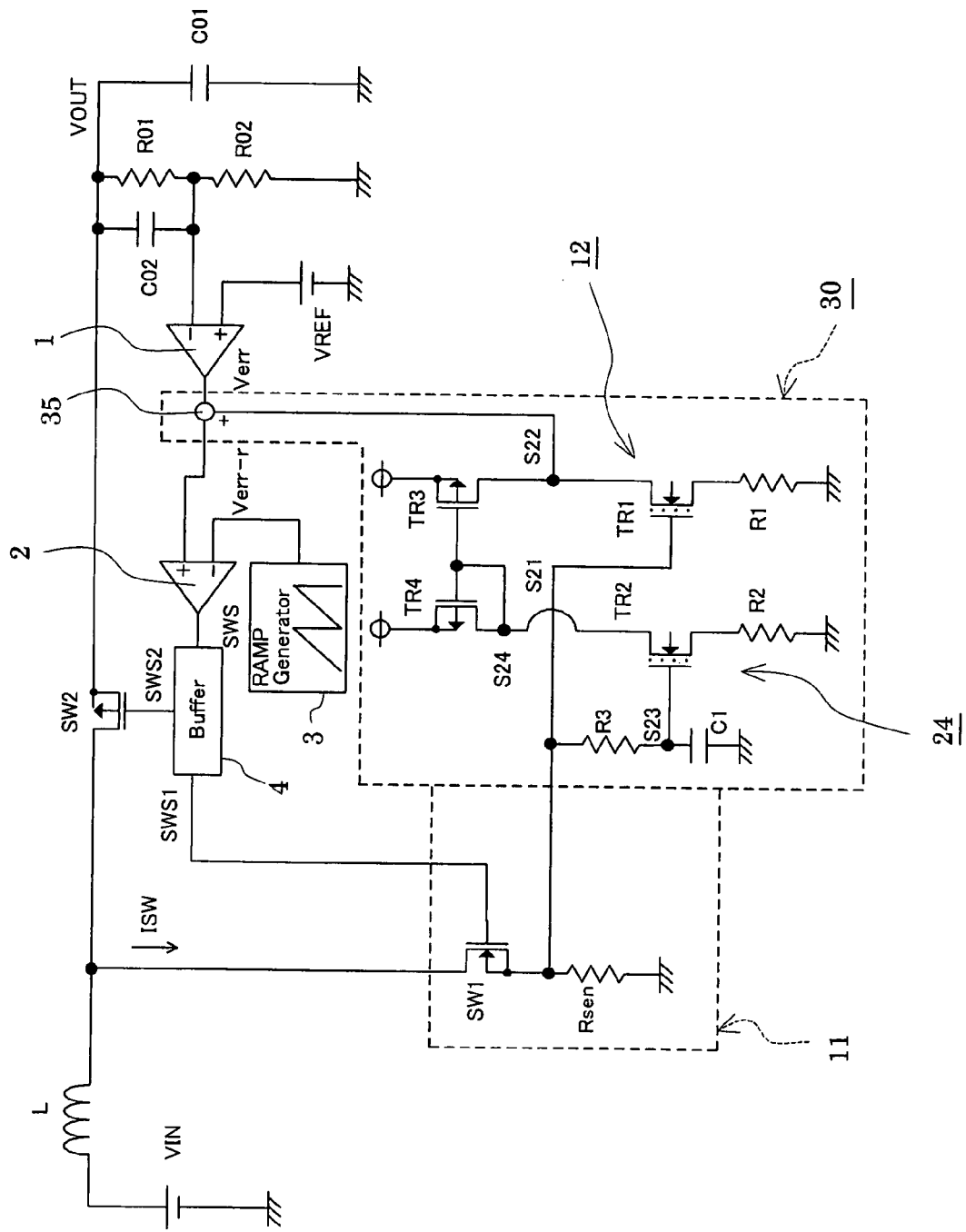
FIG. 5 is a circuit diagram showing a switching power supply circuit according to a modification of the third embodiment.

FIG. 5 is a circuit diagram showing a modification of the present embodiment in which the configuration of the portion for obtaining the current correction signal S23 has been replaced by the portion of the structure shown in FIG. 3. As shown in this drawing, the current correction signal generation means 24 can replace the current correction signal generation means 23, as in the case of FIG. 2, even in the present embodiment.

Fourth Embodiment

Figure 6:
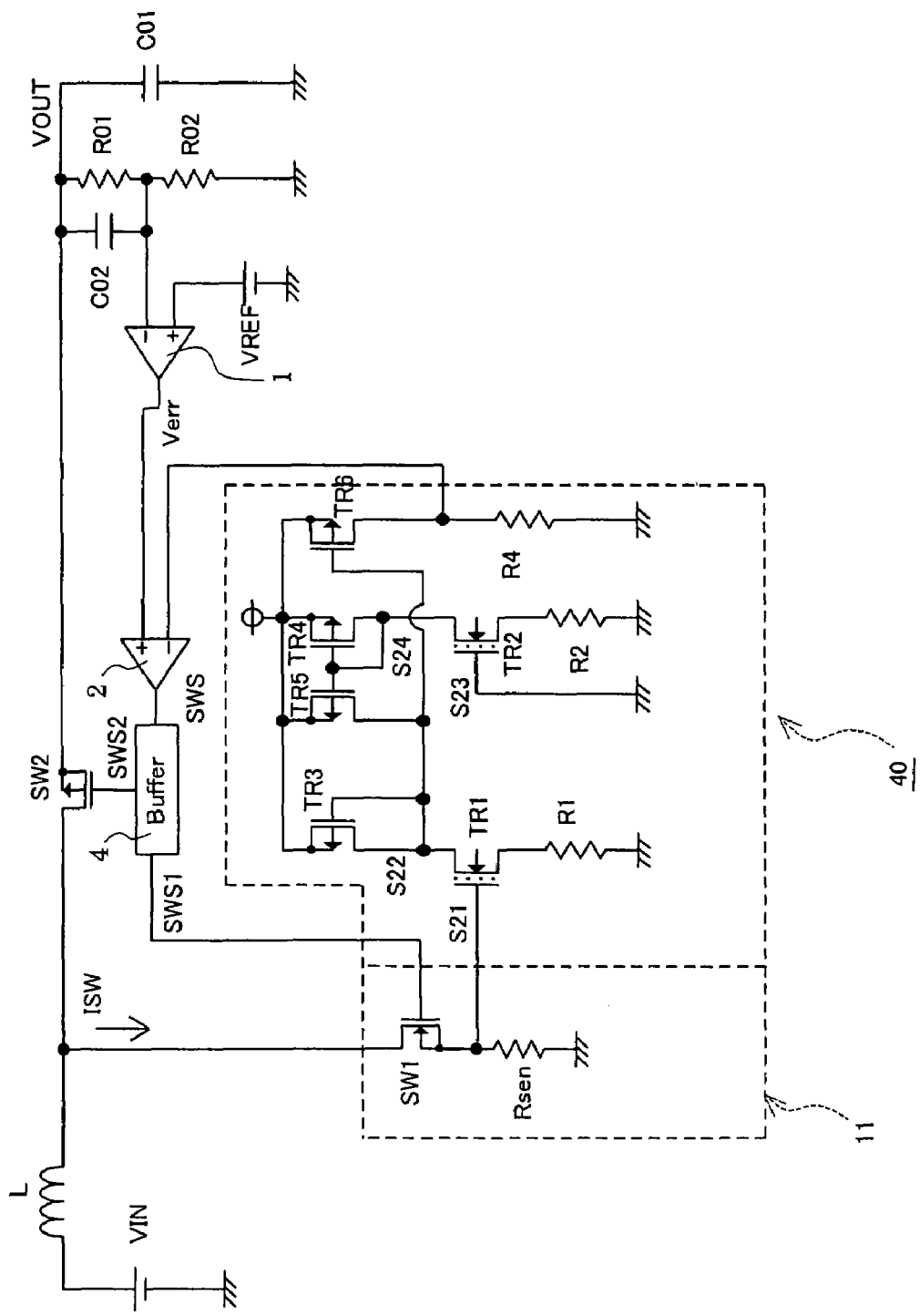
FIG. 6 is a circuit diagram showing a switching power supply circuit according to a fourth embodiment of the present invention.

FIG. 6 is a circuit diagram showing a switching power supply circuit according to a fourth embodiment of the present invention. As shown in this drawing, the present embodiment changes the configuration of the current mirror circuit as the current superposition means in the third embodiment shown in FIG. 4, and also connects the output stage of the current superposition means directly to the input side of the PWM comparator 2. The other features in the present embodiment are exactly the same as those in the third embodiment. Thus, the same portions as those in FIG. 4 are assigned the same numerals and symbols, and duplicate explanations are omitted.

As shown in FIG. 6, a current mirror circuit constituting a current mode control circuit 40 in the present embodiment has a current correction signal S24 supplied to the gate and drain of a fourth MOS transistor TR4 and the gate of a fifth MOS transistor TR5, and also has a current mode signal S22 supplied to the gate and drain of a third MOS transistor TR3, the drain of the fifth MOS transistor TR5, and the gate of a sixth MOS transistor TR6, and further constitutes an output stage by the drain of the sixth MOS transistor TR6. A signal based on the current mode signal S22 and the current correction signal S24 superposed by the current mirror circuit is inputted, via the output stage of the current mirror circuit, into an inverting input terminal of a PWM comparator 2 accepting the output of an error amplifier 1 as an input to a non-inverting input terminal thereof. A fourth resistance R4 is connected between the drain of the sixth MOS transistor TR6 and ground. Thus, the level of the output signal of the current mirror circuit can be adjusted by the ratio between the first resistance R1 and the fourth resistance R4. A capacitor may be connected instead of the fourth resistance R4. In this case, the level of the above output signal is adjusted by the ratio between the first resistance R1 and the capacitor.

In the present embodiment as well, a current feedback system performing a swift and stable action can be constituted. The switching signal SWS of the feedback control system is properly controlled by a control signal formed by this current feedback system. This can contribute to the stabilization of the transient characteristics, in particular, of the switching power supply circuit.

In the present embodiment, moreover, the current mirror circuit is composed of the four stages. By applying a sufficient power supply voltage to the third to sixth MOS transistors TR3 to TR6, therefore, it becomes possible to apply to the first and second MOS transistors TR1 and TR2 such a voltage that they are placed in saturation regions. With the current mirror circuits of the two-stage configuration shown in FIGS. 4 and 5, it becomes necessary to supply a bias voltage or a bias current from other circuit so that the MOS transistor constituting the output stage acts in a saturation region, thus complicating the configuration of the circuit.

Fifth Embodiment

Figure 7:
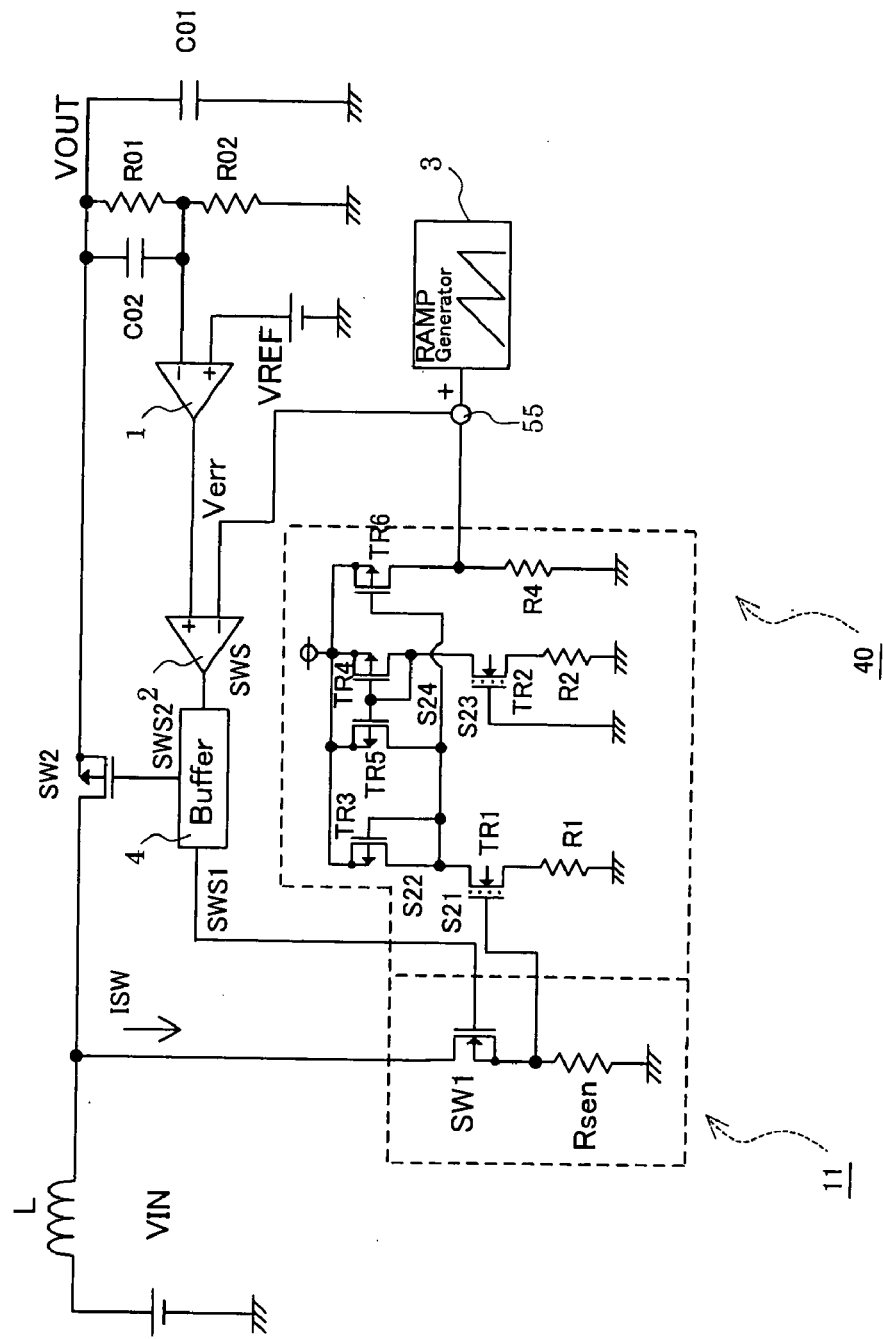
FIG. 7 is a circuit diagram showing a switching power supply circuit according to a fifth embodiment of the present invention.

FIG. 7 is a circuit diagram showing a switching power supply circuit according to a fifth embodiment of the present invention. As shown in this drawing, the present embodiment superposes the output signal of the current superposition means in the fourth embodiment, shown in FIG. 6, on the output of an oscillation circuit 3 to use the superposed signal as an input signal to a PWM comparator 2. The other features in the present embodiment are exactly the same as those in the fourth embodiment shown in FIG. 6. Thus, the same portions as those in FIG. 6 are assigned the same numerals and symbols, and duplicate explanations are omitted.

As shown in FIG. 7, a signal based on a current mode signal S22 and a current correction signal S24 superposed by a current mirror circuit is supplied to an adder 55 via the output stage of the current mirror circuit. The adder 55 is also supplied with an oscillation signal RAMP of the oscillation circuit 3. The superposed signal resulting upon addition to the oscillation signal RAMP at the adder 55 is inputted into an inverting input terminal of the PWM comparator 2 accepting the output of an error amplifier 1 as an input to a non-inverting input terminal thereof.

In the present embodiment as well, a current feedback system performing a swift and stable action can be constituted. A switching signal SWS of the feedback control system is properly controlled by a control signal formed by this current feedback system. This can contribute to the stabilization of the transient characteristics, in particular, of the switching power supply circuit.

Sixth Embodiment

Figure 8:
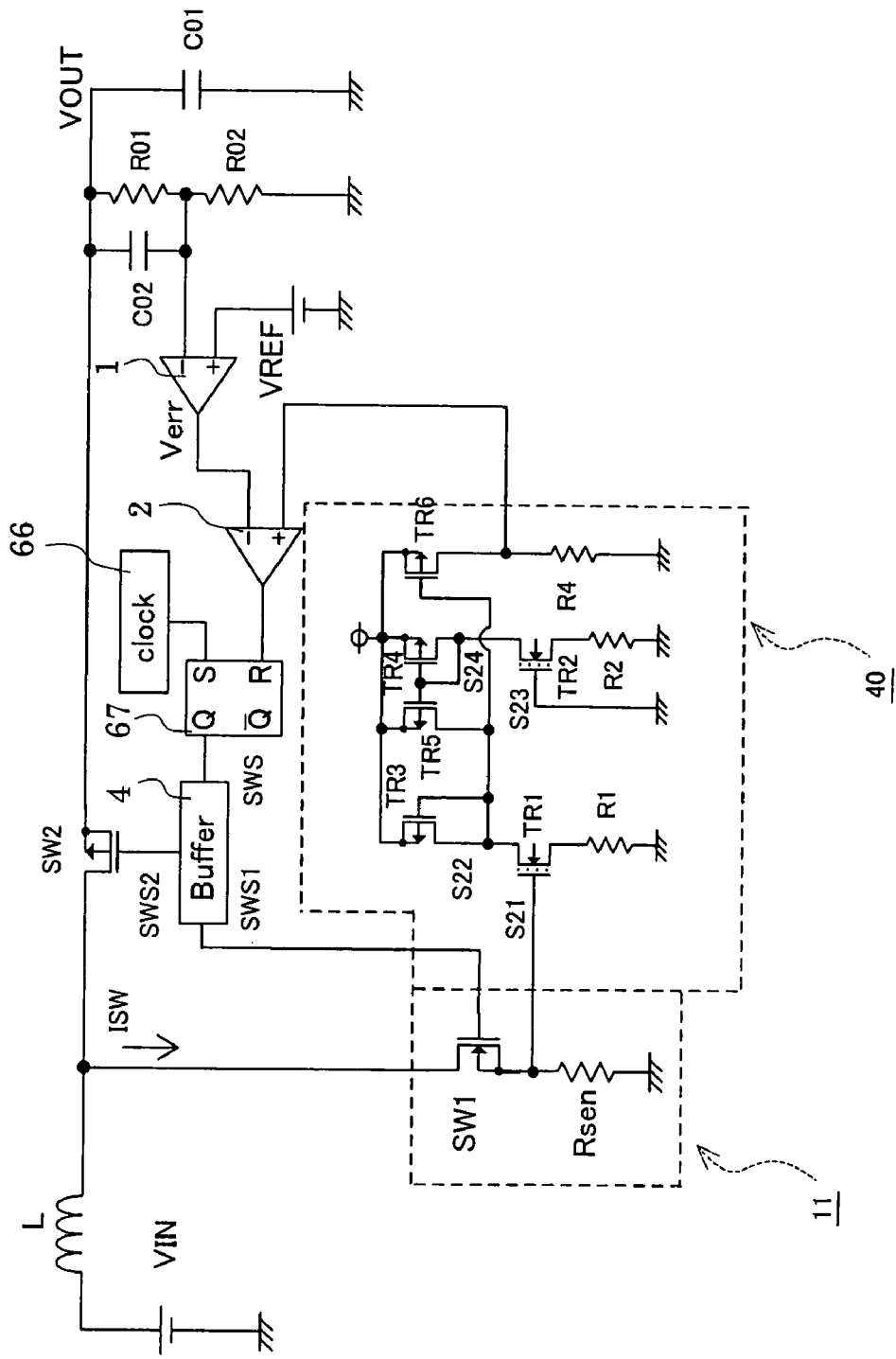
FIG. 8 is a circuit diagram showing a switching power supply circuit according to a sixth embodiment of the present invention.

FIG. 8 is a circuit diagram showing a switching power supply circuit according to a sixth embodiment of the present invention. As shown in this drawing, the present embodiment obtains the switching signal SWS, which is supplied to the buffer circuit 4 in the fourth embodiment shown in FIG. 6, via a flip-flop circuit 67. The other features in the present embodiment are exactly the same as those in the fourth embodiment shown in FIG. 6. Thus, the same portions as those in FIG. 6 are assigned the same numerals and symbols, and duplicate explanations are omitted.

As shown in FIG. 8, a signal based on a current mode signal S22 and a current correction signal S24 superposed by a current mirror circuit is inputted to a non-inverting input terminal of a PWM comparator 2, which accepts the output of an error amplifier 1 as an input to an inverting input terminal thereof, via the output stage of the current mirror circuit.

In the flip-flop circuit 67, a clock signal, which is the output signal of a clock generator 66, is supplied to its set terminal, and the output signal of the PWM comparator 2 is supplied to its reset terminal. Thus, the switching signal SWS based on the output signal of the PWM comparator 2 is outputted from the Q-output terminal of the flip-flop circuit 67.

In the present embodiment as well, a control signal formed by the current feedback system, which performs a swift and stable action, properly controls the switching signal SWS of the feedback control system. This can contribute to the stabilization of the transient characteristics, in particular, of the switching power supply circuit.

Seventh Embodiment

Figure 9:
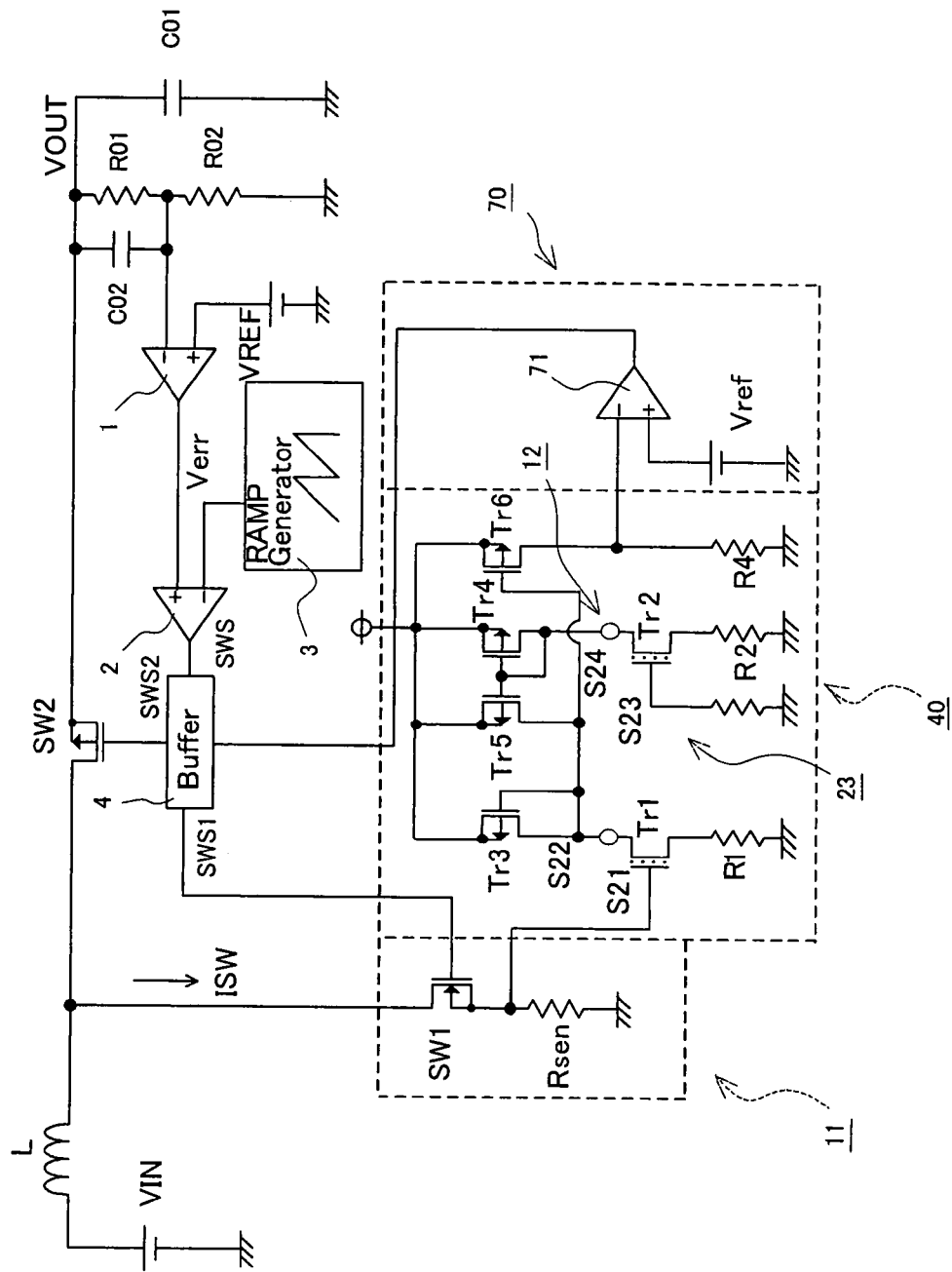
FIG. 9 is a circuit diagram showing a switching power supply circuit according to a seventh embodiment of the present invention.

FIG. 9 is a circuit diagram showing a switching power supply circuit according to a seventh embodiment of the present invention. As shown in this drawing, the present embodiment has a current limiting circuit 70 which exercises control via a feedback control system such that a switching means SW1 becomes OFF, if the value of a current ISW flowing through the switching means SW1 exceeds a limiting current value. However, the current limiting circuit 70 similarly has the current detection means 11 and the current mode control circuit 40 shown in FIGS. 6 to 8, and adds a comparator 71, etc. to these members. Thus, the same portions as those in FIGS. 6 to 8 are assigned the same numerals and symbols, and duplicate explanations are omitted.

As shown in FIG. 9, the output of a current mirror circuit, which superposes a current mode signal S22 and a current correction signal S24, is inputted to one of the input terminals of the comparator 71 boosted by a resistance R4 relative to the ground potential. To the other input terminal of the comparator 71, a predetermined reference voltage $V_{ref}$ is supplied. As a result, if the current ISW flowing through the switching means SW1 exceeds the limiting current value, on-off control of the switching means SW1, SW2 is effected via a buffer circuit 4 of the feedback control system.

In the present embodiment as well, the control signal formed by the current feedback system, which performs a swift and stable action, properly controls the switching signal SWS of the feedback control system. This can contribute to the stabilization of the transient characteristics, in particular, of the switching power supply circuit.

In the present embodiment, the current limiting circuit is formed by use of the current mode control circuit 40. However, similar current control can be performed by utilizing the output signal of the current mode control circuit 10, 20 or 30 shown in FIGS. 1 to 5.

Furthermore, the second current correction signal S23 supplied to the gate of the second MOS transistor TR2 of the current correction signal generation means 23 has been described as arbitrary. Of course, however, the second current correction signal S23 can be used as the limiting current value in the present embodiment.

Eighth Embodiment

Figure 10:
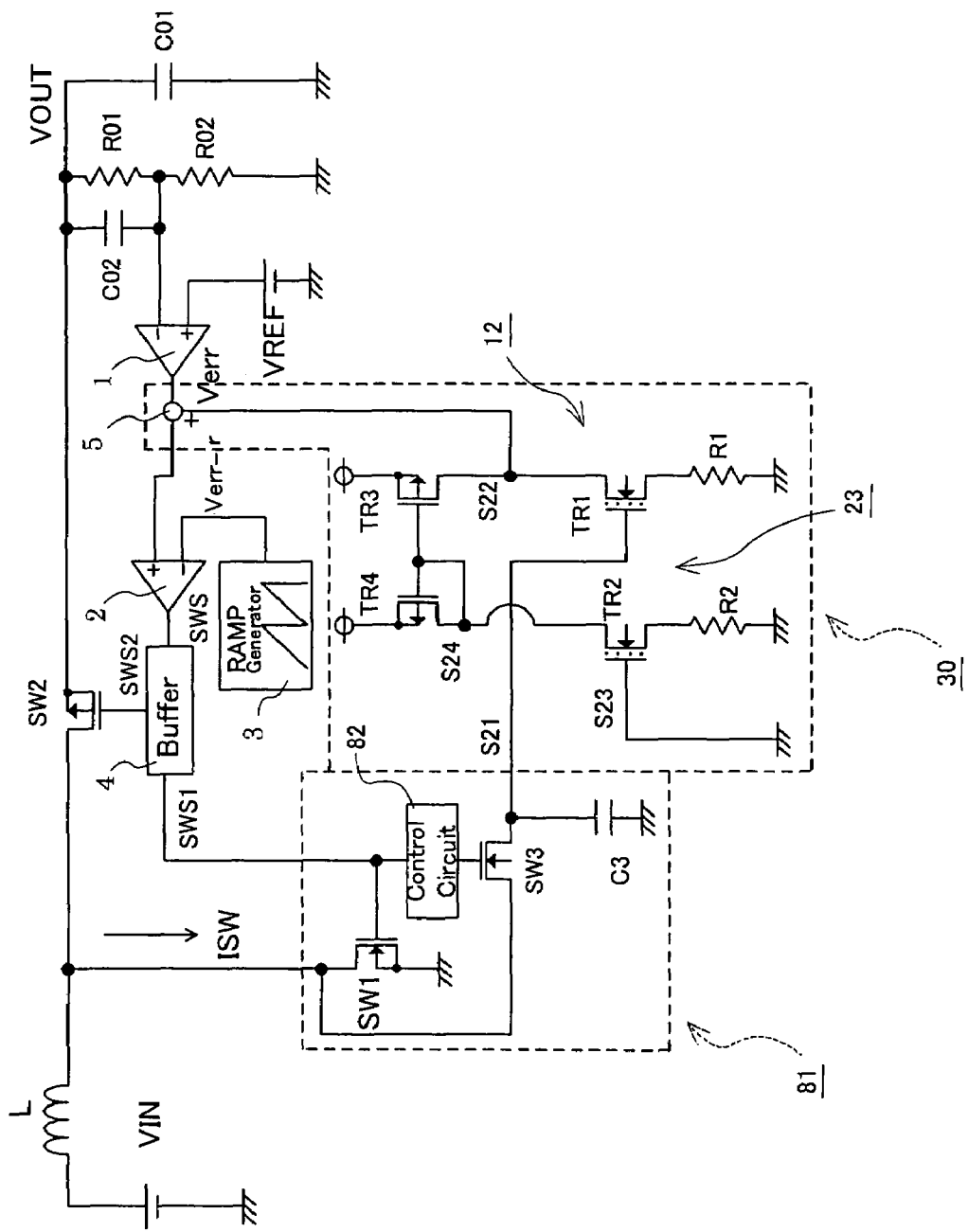
FIG. 10 is a circuit diagram showing a switching power supply circuit according to an eighth embodiment of the present invention.

FIG. 10 is a circuit diagram showing a switching power supply circuit according to an eighth embodiment of the present invention. As shown in this drawing, the present embodiment is changed only in the configuration of a current detection means 81, which can be combined with any of the current mode signal generation means 12 and the current correction signal generation means 23, 24 of the switching power supply circuits according to the aforementioned first to seventh embodiments. Thus, the same portions as those in FIGS. 1 to 9 are assigned the same numerals and symbols, and duplicate explanations are omitted.

As shown in FIG. 10, the current detection means 81 in the present embodiment is configured to obtain a first current information signal S21 from the point of connection between a current detection switching means SW3, which is connected to a switching means SW1 via an ON-resistance of the switching means SW1, and a third capacitor C3 connected in series with the current detection switching means SW3.

Consequently, the present embodiment can omit the current detection resistance $R_{sen}$ for current detection in FIG. 1, etc., and can be conducive to downsizing the switching power supply circuit.

The present embodiment is provided with a control circuit 82 for controlling the timing of the action of the switching means SW3 for the timing of the action of the switching means SW1. This control circuit 82 controls the timing of the action of the switching means SW3 such that after the switching means SW1 reliably becomes ON, the switching means SW3 enters the ON-state, and after the switching means SW3 reliably becomes OFF, the switching means SW1 enters the OFF-state. That is, after the rise of the switching signal SWS1, the switching signal is supplied to the gate of the current detection switching means SW3 with some delay. Also, slightly prior to the fall of the switching signal SWS1, the switching signal is supplied to the gate of the current detection switching means SW3.

Ninth Embodiment

Figure 11:
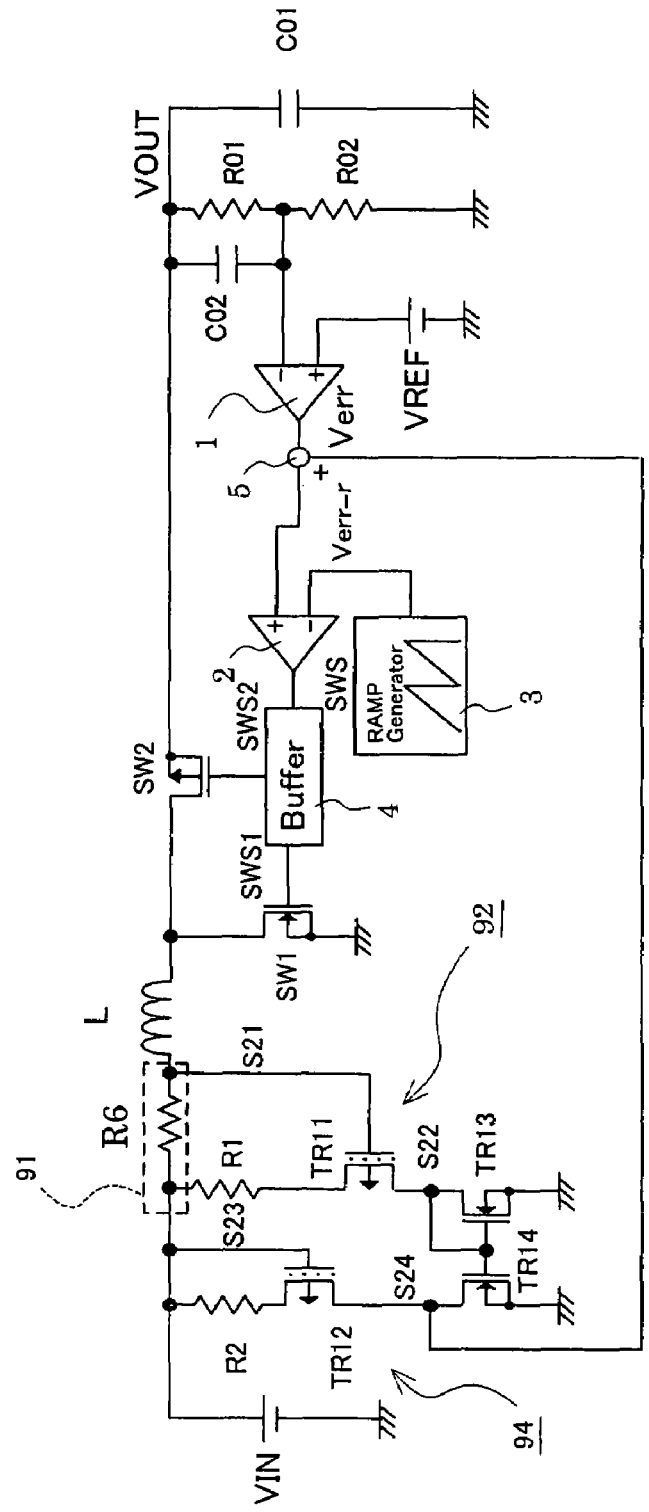
FIG. 11 is a circuit diagram showing a switching power supply circuit according to a ninth embodiment of the present invention.

FIG. 11 is a circuit diagram showing a switching power supply circuit according to a ninth embodiment of the present invention. As shown in this drawing, the present embodiment is changed only in the configuration of a current detection means 91, which can be combined with any of the current mode signal generation means 12 and the current correction signal generation means 23, 24 of the switching power supply circuits according to the aforementioned first to seventh embodiments. Thus, the same portions as those in FIGS. 1 to 9 are assigned the same numerals and symbols, and duplicate explanations are omitted.

As shown in FIG. 11, the current detection means 91 is configured to obtain a first current information signal S21 from the point of connection between an inductor L and a sixth resistance R6 connected in series with the inductor L, and a current correction signal generation means 94 is arranged to obtain a second current correction signal S23 from the other end of the sixth resistance R6.

A current mirror circuit as a current superposition means in the present embodiment is constructed by replacing P-channel MOS transistors TR11, TR12 for the first to second MOS transistors TR1, TR2 which are the constituent elements of the current mirror circuits shown in FIGS. 4 to 5, and by replacing N-channel MOS transistors TR13, TR14 for the third to fourth MOS transistors TR3, TR4. That is, the first and third MOS transistors TR11 and TR13 form a current mode signal generation means 92, while the second and fourth MOS transistors TR12 and TR14 form the current correction signal generation means 94.

According to the present embodiment described above, a current always flows through the current detection means 91, so that correct current information can be easily obtained. This can contribute to the stabilization of the action of a high frequency switching power supply circuit, in particular.

Tenth Embodiment

Figure 12:
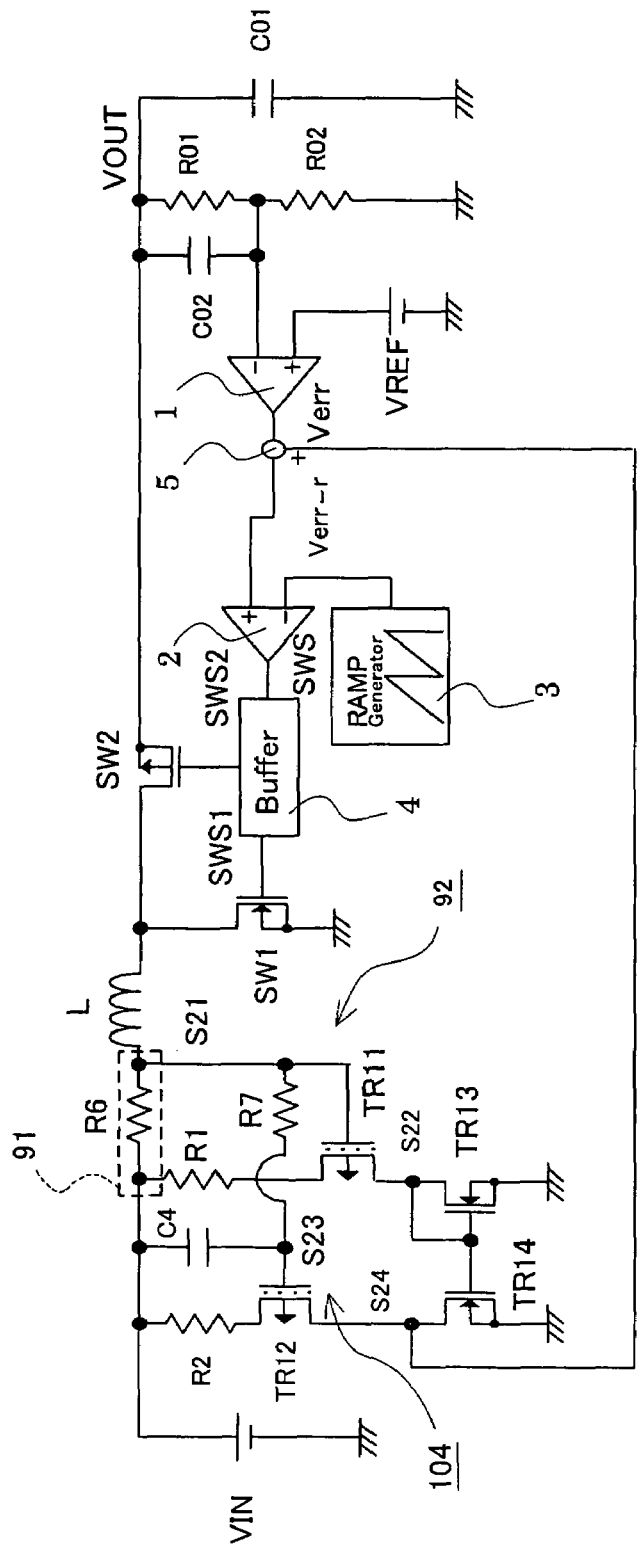
FIG. 12 is a circuit diagram showing a switching power supply circuit according to a tenth embodiment of the present invention.

FIG. 12 is a circuit diagram showing a switching power supply circuit according to a tenth embodiment of the present invention. As shown in this drawing, the present embodiment is a variation of the ninth embodiment shown in FIG. 11 only in terms of the configuration of a current correction signal generation means 104. Thus, the same portions as those in FIG. 11 are assigned the same numerals and symbols, and duplicate explanations are omitted.

As shown in FIG. 12, the current correction signal generation means 104 according to the present embodiment is configured to connect a seventh resistance R7 to the point of connection between an inductor L and a sixth resistance R6, further connect the other end of the seventh resistance R7 to a fourth capacitor C4, and obtain a second current correction signal S23 from the point of connection between the seventh resistance R7 and the fourth capacitor C4.

A current mirror circuit as a current superposition means in the present embodiment is of the same configuration as that shown in FIG. 11.

Other Embodiment 1

Figure 13:
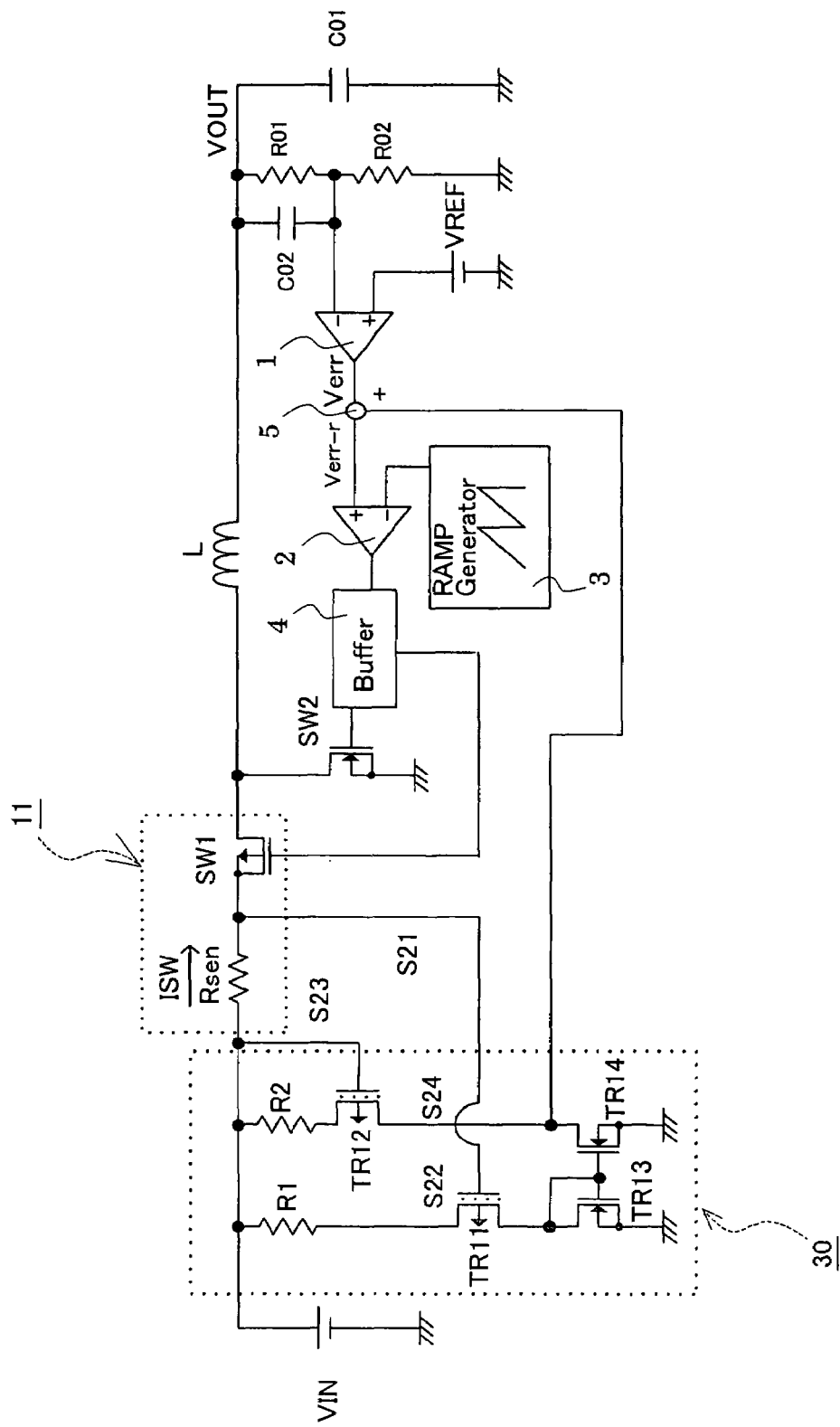
FIG. 13 is a circuit diagram showing a step-down switching power supply circuit according to a different embodiment of the present invention.

The first to tenth embodiments described above are all step-up switching power supply circuits, but needless to say, step-down switching power supply circuits can be formed based on the same technical ideas as described there. As an example, FIG. 13 shows a step-down switching power supply circuit corresponding to the switching power supply circuit shown in FIG. 4. In FIG. 13, portions functionally corresponding to the portions in FIG. 4 are assigned the same numerals and symbols.

Other Embodiment 2

Figure 14:
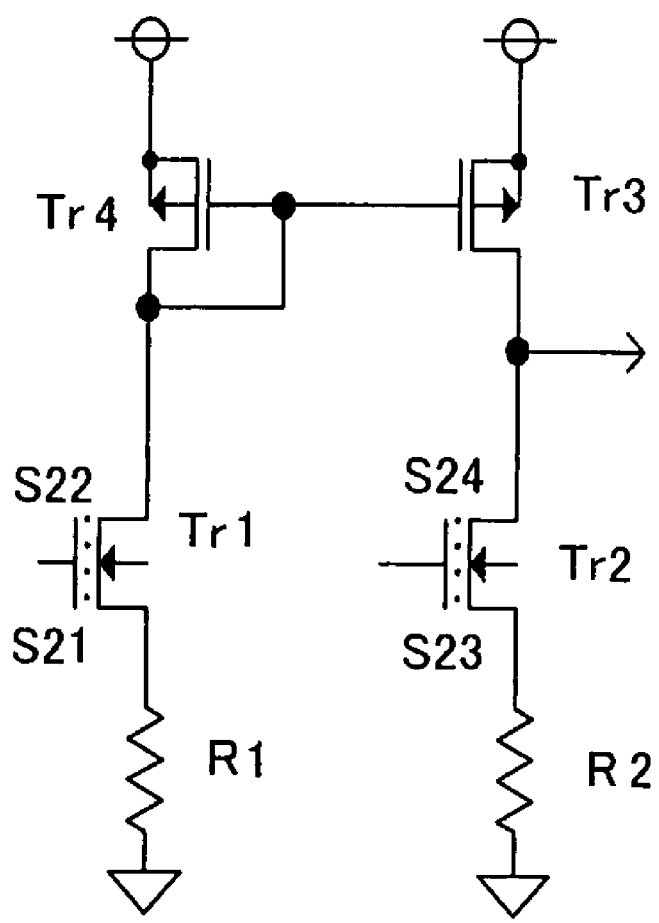
FIG. 14 is a circuit diagram showing a modification 1 of a current mirror circuit in the different embodiment of the present invention.

FIG. 14 is a circuit diagram showing a modification 1 of the current mirror circuit. The current mirror circuit shown in this drawing has a current mode signal S22 connected to the gate and drain of a fourth MOS transistor TR4 and the gate of a third MOS transistor TR3, and has a current correction signal S24 connected to the drain of the third MOS transistor TR3, constituting an output stage.

That is, the structure shown there is a structure in which the third to fourth MOS transistors TR3 and TR4 of the current mirror circuits shown in FIGS. 4 and 5 have been interchanged. As a result, the current is pulled in via the output stage in the current mirror circuits shown in FIGS. 4 and 5, while the current is pulled out from the output stage in the circuit of the present embodiment shown in FIG. 14.

The current mirror circuit shown in FIGS. 6 to 9 can be replaced by the current mirror circuit of the present embodiment shown in FIG. 14.

Other Embodiment 3

Figure 15:
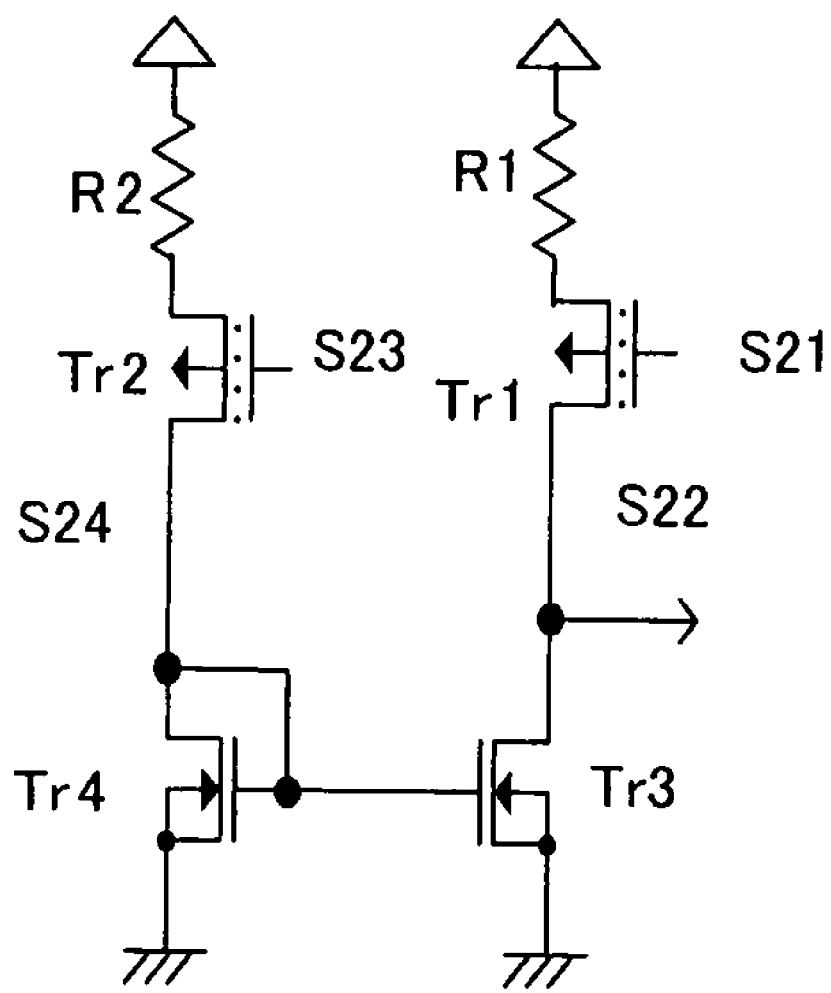
FIG. 15 is a circuit diagram showing a modification 2 of the current mirror circuit in the different embodiment of the present invention.

FIG. 15 is a circuit diagram showing a modification 2 of the current mirror circuit. The current mirror circuit shown in this drawing is a circuit in which the first to second MOS transistors TR1 and TR2 of the current mirror circuits, which are shown in FIGS. 4 and 5, are formed of the P-channel type, and the third to fourth MOS transistors TR3 and TR4 are formed of the N-channel type.

Figure 16:
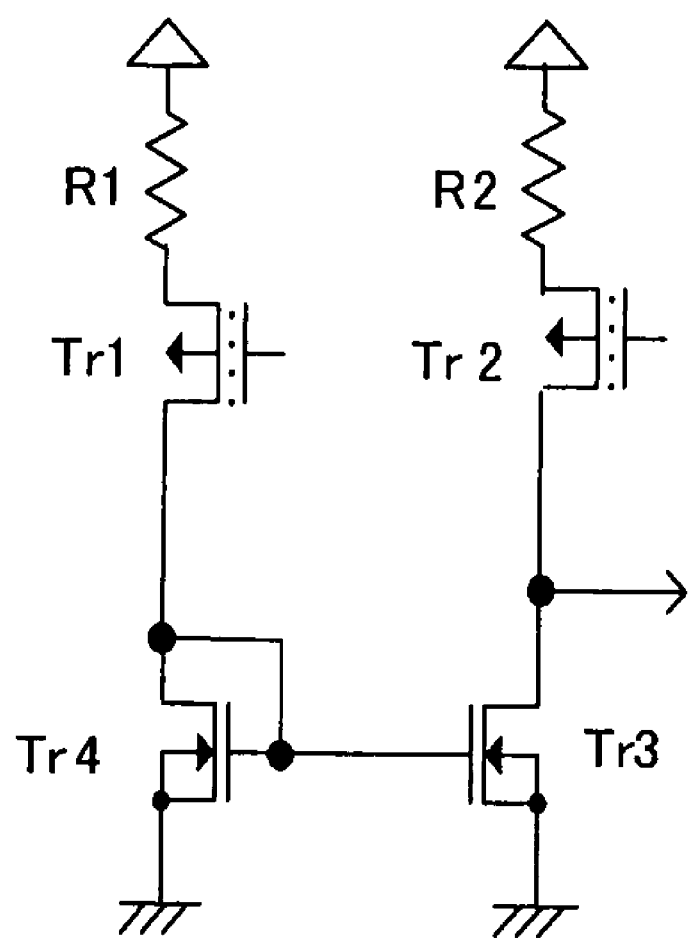
FIG. 16 is a circuit diagram showing a modification 3 of the current mirror circuit in the different embodiment of the present invention.

On the other hand, FIG. 16 is a circuit diagram showing a modification 3 of the current mirror circuit. The current mirror circuit shown in this drawing is a circuit in which the first to second MOS transistors TR1 and TR2 of the current mirror circuit, which is shown in FIG. 14, are formed of the P-channel type, and the third to fourth MOS transistors TR3 and TR4 are formed of the N-channel type.

That is, the current mirror circuit constituting the current superposition means in the present invention can be realized, regardless of whether it is of the P-channel type or of the N-channel type. The current mirror circuits shown in FIGS. 4 and 5 can be replaced by the current mirror circuit shown in FIG. 15. The current mirror circuit shown in FIGS. 6 to 9 can be replaced by the current mirror circuit shown in FIG. 16.

Other Embodiment 4

All the current mirror circuits constituting the current superposition means in the present invention can be composed of the four-stage current mirror circuits shown in FIGS. 4 to 9.

Other Embodiment 5

In FIGS. 1 to 16, the first and second MOS transistors TR1 and TR2 are all of the depletion type, but are not limited to this type.

The present invention can be used, for example, in the industrial field of electronic equipment where a switching power supply circuit for forming a power supply circuit in a cellular phone or a personal computer is produced and marketed.

Although the present invention has been described by the above embodiments, it should be understood that the invention is not limited to these embodiments, but may be varied in many ways. Such changes, substitutions and alterations can be made therein without departing from the spirit and scope of the invention as defined by the appended claims.

What is claimed is:

1. A switching power supply circuit having a feedback control system for detecting a direct current output voltage and a current flowing through switching means or an inductor, and exercising on-off control of the switching means, comprising:

a current mode control circuit including
current detection means for detecting the current, and
current mode signal generation means for generating a current mode signal being a drain current or a source current of a first MOS transistor obtained by supplying a first current information signal, which is an output signal of the current detection means, to a gate of the first MOS transistor, and connecting a first resistance to a source or a drain of the first MOS transistor,
and adapted to supply the current mode signal to the feedback control system.

2. The switching power supply circuit according to claim 1, wherein
the current mode control circuit further includes current correction signal generation means for generating a current correction signal for correcting the current mode signal with a drain current or a source current of a second MOS transistor which is obtained by supplying a second current information signal for the first current information signal to a gate of the second MOS transistor, and by connecting a second resistance to a source or a drain of the second MOS transistor.

3. The switching power supply circuit according to claim 2, which
exercises control, based on the current mode signal, such that an ON-period of a switching signal for on-off control of the switching means is shortened and
also exercises control, based on the current correction signal, such that the ON-period of the switching signal is lengthened.

4. The switching power supply circuit according to claim 2, wherein
the current correction signal generation means has a third resistance and a first capacitor connected in series, delays the first current information signal, which has been detected by the current detection means, based on a time constant, and outputs the delayed first current information signal as the second current information signal via a point of connection between the third resistance and the first capacitor.

5. The switching power supply circuit according to claim 2, wherein
the second current information signal is a voltage, at which the current shows zero or nearly zero, or is a voltage conformed to the current.

6. The switching power supply circuit according to claim 1, wherein
the current mode signal generation means adds the current mode signal to an output of, or an interior of, an error amplifier of the feedback control system, which outputs an error signal representing a differential voltage between a preset reference voltage and a voltage based on the direct current output voltage, such that a duty ratio of the output of the error amplifier is decreased.

7. The switching power supply circuit according to claim 6, wherein
the current mode control circuit further includes current correction signal generation means for generating a current correction signal for correcting the current mode signal with a drain current or a source current of a second MOS transistor which is obtained by supplying a second current information signal for the first current information signal to a gate of the second MOS transistor, and by connecting a second resistance to a source or a drain of the second MOS transistor.

8. The switching power supply circuit according to claim 7, wherein
a signal based on the current mode signal and the current correction signal is outputted to a PWM comparator of the feedback control system, the PWM comparator receiving the output of the error amplifier as one of inputs and receiving the signal as the other input.

9. The switching power supply circuit according to claim 8, wherein
the signal based on the current mode signal and the current correction signal is superposed on a RAMP wave to be supplied to the PWM comparator, and the superposed signal is supplied to the PWM comparator as the other input.

10. The switching power supply circuit according to claim 8, wherein
an output signal of the PWM comparator becomes a control signal for on-off control of the switching means via a flip-flop circuit.

11. A switching power supply circuit having a feedback control system for detecting a direct current output voltage and a current flowing through switching means or an inductor, and exercising on-off control of the switching means, comprising:
a current limiting circuit including
current detection means for detecting the current,
current mode signal generation means for generating a current mode signal being a drain current or a source current of a first MOS transistor obtained by supplying a first current information signal, which is an output signal of the current detection means, to a gate of the first MOS transistor, and connecting a first resistance to a source or a drain of the first MOS transistor, and
current correction signal generation means for generating a current correction signal for correcting the current mode signal with a drain current or a source current of a second MOS transistor which is obtained by supplying a second current information signal for the first current information signal to a gate of the second MOS transistor, and by connecting a second resistance to a source or a drain of the second MOS transistor,
and adapted to exercise control via the feedback control system such that the switching means becomes OFF, if a value of the current exceeds a limiting current value.

12. The switching power supply circuit according to claim 11, wherein
a signal based on the current mode signal and the current correction signal is outputted to an input stage of current limiting comparison means for comparing the signal with the limiting current value.

13. The switching power supply circuit according to claim 11, wherein
the second current information signal is taken as the limiting current value.

14. The switching power supply circuit according to claim 13, wherein
the current mode signal generation means and the current correction signal generation means constitute current superposition means being a current mirror circuit.

15. The switching power supply circuit according to claim 14, wherein
influence on the current mode signal based on the first current information signal is greater than influence on the current correction signal based on the second current information signal.

16. The switching power supply circuit according to claim 14, wherein
the current superposition means has the current correction signal supplied to a gate and a drain of a fourth MOS transistor and a gate of a third MOS transistor, and has the current mode signal supplied to a drain of the third MOS transistor, constituting an output stage.

17. The switching power supply circuit according to claim 16, wherein
a fourth resistance or a second capacitor is connected to the output stage, and
a level of an output signal of the current superposition means can be adjusted by a ratio between the first resistance and the fourth resistance, or a ratio between the first resistance and the second capacitor.

18. The switching power supply circuit according to claim 14, wherein
the current superposition means has the current correction signal supplied to a gate and a drain of a fourth MOS transistor and a gate of a fifth MOS transistor, and has the current mode signal supplied to a gate and a drain of a third MOS transistor, a drain of the fifth MOS transistor and a gate of a sixth MOS transistor, and further has a drain of the sixth MOS transistor constituting an output stage.

19. The switching power supply circuit according to claim 14, wherein
the current superposition means has the current mode signal supplied to a gate and a drain of a fourth MOS transistor and a gate of a third MOS transistor, and has the current correction signal supplied to a drain of the third MOS transistor, constituting an output stage.

* * * * *